United States Patent
Schindler et al.

(10) Patent No.: US 8,352,155 B2
(45) Date of Patent: Jan. 8, 2013

(54) ENGINE FOR AN AGRICULTURAL HARVESTER HAVING ISOCHRONOUS TORQUE CURVE WITH POWER BULGE

(75) Inventors: Rodney A. Schindler, Bettendorf, IA (US); Alan D. Sheidler, Moline, IL (US); Joseph P. Schmitz, Waterloo, IA (US)

(73) Assignee: Deere & Company, Moline, IL (US)

( * ) Notice: Subject to any disclaimer, the term of this patent is extended or adjusted under 35 U.S.C. 154(b) by 831 days.

(21) Appl. No.: 12/470,198

(22) Filed: May 21, 2009

(65) Prior Publication Data
US 2010/0299048 A1    Nov. 25, 2010

(51) Int. Cl.
*F02D 41/30* (2006.01)
(52) U.S. Cl. .......... 701/103; 701/110; 123/436
(58) Field of Classification Search ........ 123/436, 123/350, 357; 701/103–105, 110
See application file for complete search history.

(56) References Cited

U.S. PATENT DOCUMENTS

| | | | |
|---|---|---|---|
| 5,868,214 A | 2/1999 | Workman | |
| 7,295,914 B2 | 11/2007 | Schmid | |
| 7,628,015 B2 * | 12/2009 | Marumoto et al. | 60/607 |
| 8,027,780 B2 * | 9/2011 | Whitney et al. | 701/110 |

OTHER PUBLICATIONS

U.S. Appl. No. 12/235,042, filed Sep. 22, 2008.

* cited by examiner

*Primary Examiner* — Hai Huynh

(57) ABSTRACT

A method of operating an IC engine in an agricultural harvester includes the steps of: operating the IC engine in a normal mode with a base torque curve as a function of engine operating speed and engine power output, the base torque curve being generally isochronous at a rated operating speed over a power output range terminating at a rated power output; and operating the IC engine in a boost mode with a boost torque curve when a power boost is required above the rated power output, the boost torque curve having a power output which is above the base torque curve over a predefined range of the operating speed.

15 Claims, 3 Drawing Sheets

ENGINE FOR AN AGRICULTURAL HARVESTER HAVING ISOCHRONOUS TORQUE CURVE WITH POWER BULGE

FIELD OF THE INVENTION

The present invention relates to internal combustion engines used to power agricultural harvesters, and, more particularly, to operating internal combustion engines using defined torque curves.

BACKGROUND OF THE INVENTION

A work machine, such as a construction work machine, an agricultural work machine or a forestry work machine, typically includes a prime mover in the form of an internal combustion (IC) engine. The IC engine may either be in the form of a compression ignition engine (i.e., diesel engine) or a spark ignition engine (i.e., gasoline engine). For most heavy work machines, the prime mover is in the form of a diesel engine having better lugging, pull-down and torque characteristics for associated work operations.

IC engines are used to power work machines under a wide variety of load conditions and must be able to accept sudden changes in load. When the vehicle is in a transport mode, sudden increases in power and torque are required from the engine when negotiating the terrain between fields. Tillage in field also presents conditions where there are sudden increases in load due to changes in soil condition, where the resistance of the tillage tool increases significantly or the field has steep inclines. Engines of this type are expected to respond to these conditions by increasing output torque with only a small increase in engine load. This increase in torque output is typically referred to as torque rise. Engines with significant torque rise permit the torque curve to be shaped so that the rate of rise is very steep allowing the engine to decrease rpm very little at the same time output torque increases significantly. Engines that are governed use the shape of the governor curve to make the slope extremely steep for operation at or below rated rpm and torque. During conditions of higher torque, the shape of the torque limit curve determines the rate of torque rise versus decreasing engine rpm. Significant efforts are applied to shaping the torque limit curve for full throttle operation with the object of giving the tractor its feel of power and responsiveness. Some engine control systems make the curve significantly steep in the first 100-400 rpm in loaded speed below rated rpm. However, this comes at the expense of torque rise at lower engine rpm down to the peak torque of the engine. Steep torque rises encourage the operator to run in this range or at higher speeds because of the sensation of power. In a typical work vehicle equipped with a heavy duty diesel engine, the overall sound and quality of sound both increase as the engine rpm is pulled down by the increasing load requirement. This reinforces the sensation of power and responsiveness. In addition, the change in the rate of torque rise that occurs at approximately rated rpm gives a signal to the operator that the engine is approaching its limit for the operating rpm chosen.

An operational problem occurs when the engine is operated at lower power settings and lower engine rpm. In current systems the governor reduces the torque rise as the engine approaches rated engine rpm. The change in engine response signals the operator that the engine is nearing its torque limit for the chosen operating rpm. At lower power settings, when the engine encounters a step increase in load, the torque rises abruptly. Once the torque reaches the torque limit curve for that particular governor rpm setting, a further increase in torque causes the engine to operate along the torque limit curve in a region where the rate of torque rise per decrease in engine rpm is very low. This occurs because operation under these conditions does not permit the benefit of the shaped portion of the torque curve which provides a warning that the system is moving from the governor range of control to the torque limit. In terms of operator sensation, it appears that a vehicle suddenly runs out of power, (i.e. runs out of its ability to respond to an increase in load).

Work machines such as combine harvesters currently have a basic engine torque curve to provide a nominal rated power at a power level approximately 14% below the power capability envelope of the engine. Experience has shown that a 14% power bulge (from 2,200 rpm rated speed down to 2,000 rpm peak power) provides good slug handling capability and enhanced drivability for the operator. This enables the use of a power boost for unloading or a power bulge for additional power to handle gradual increases in a load or to handle slugs or other operational overloads without excessive loss of functional engine speed or the stalling of the engine. Traditional engine torque curves for combines have been developed to use this high level of power bulge above the normal rated power in order to enhance the ability of the power train and threshing system to handle the slugs and transient overloads during the harvesting operation. Such an overload may occur when clumps of moist material suddenly enter the threshing system causing higher, short duration overloads.

At the lower power end of the operational spectrum, work machines such as combines also spend significant time at very light loads, such as idling or going down hills. In these cases, the high end torque curves that work well for performance, such as slug acceptance, high threshing loads, unloading grain on the go, etc., do not return as good of fuel economy as an engine torque curve optimized for a lower power level operation.

What is needed in the art is an agricultural harvester with an IC engine which operates on a torque curve with improved performance and efficiency.

SUMMARY OF THE INVENTION

The invention in one form is directed to a method of operating an IC engine in an agricultural harvester, including the steps of: operating the IC engine in a normal mode with a base torque curve as a function of engine operating speed and engine power output, the base torque curve being generally isochronous at a rated operating speed over a power output range terminating at a rated power output; and operating the IC engine in a boost mode with a boost torque curve when a power boost is required above the rated power output, the boost torque curve having a power output which is above the base torque curve over a predefined range of the operating speed.

The invention in another form is directed to an agricultural harvester including an IC engine having fuel injectors. A detector provides an output signal representing a power output from the IC engine. An electrical processing circuit is coupled with the detector and receives the output signal. The electrical processing circuit selectively operates the fuel injectors in a normal mode or a boost mode, wherein:

the normal mode utilizes a base torque curve as a function of engine operating speed and engine power output, the base torque curve being generally isochronous at a rated operating speed over a power output range terminating at a rated power output; and the boost mode utilizes a boost torque curve when a power boost is required above the rated power output, the boost torque curve having a power output which is above the base torque curve over a predefined range of the operating speed.

DETAILED DESCRIPTION OF THE INVENTION

Figure 1:
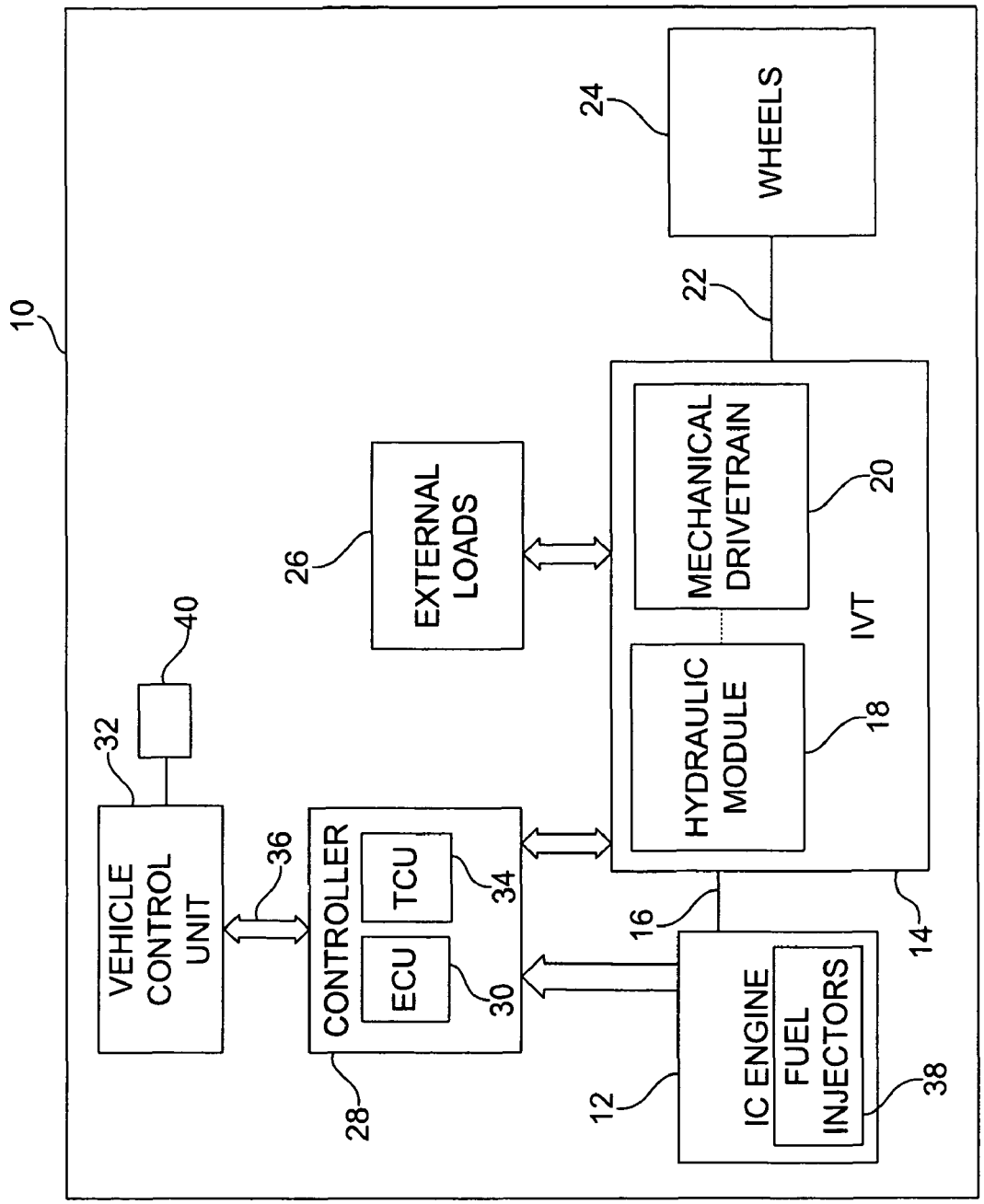
FIG. 1 is a schematic illustration of an embodiment of an agricultural harvester of the present invention.

Referring now to FIG. 1, there is shown a schematic illustration of an embodiment of an agricultural harvester 10 of the present invention. Agricultural harvester 10 is assumed to be a John Deere agricultural combine, but could be a different type of agricultural harvester.

Agricultural harvester 10 includes an IC engine 12 which is coupled with an IVT 14, typically through an output crankshaft 16 from IC engine 12. IC engine 12 is assumed to be a diesel engine in the illustrated embodiment, but could also be a gasoline engine, propane engine, etc. IC engine 12 is sized and configured according to the application.

IVT 14 generally includes a hydraulic module 18 and a mechanical drive train module 20. IVT 14 is assumed to be a hydrostatic or hydromechanical transmission of conventional design, and thus is not described in great detail herein. IVT 14 has an output which is coupled with at least one other downstream drive train component 22, which in turn is coupled with a plurality of drive wheels 24, one of which is shown in FIG. 1. Of course, it will be appreciated that drive train component 22 could also be coupled with a ground engaging track.

IVT 14 also provides output power to one or more external loads 26, which in turn thus provide an additional load on IC engine 12. External loads 26 typically are in the form of hydraulic loads, such as a grain unloading auger, etc. The total load placed upon IC engine 12 thus is a function of both tractive loads and external hydraulic loads.

An electrical processing circuit 28 is configured as one or more controllers. In the embodiment shown, controller 28 includes an engine control unit (ECU) 30 which electronically controls operation of IC engine 12, such as the operation of fuel injectors 38. Fuel injectors 38 include injectors for each engine cylinder to inject a selected quantity of fuel at a predetermined time in the engine cycle. The injectors may be unit injectors, high pressure common rail or other devices. Fuel injectors 38 receive control input signals from ECU 30.

ECU 30 is coupled with a plurality of sensors (not specifically shown) associated with operation of IC engine 12. For example, ECU 30 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 30 may receive output signals from vehicle control unit (VCU) 32 representing vehicle control parameters input by an operator, such as a commanded ground speed (indicated by a position of the throttle and/or hydrostat lever) or a commanded direction of agricultural harvester 10 (indicated by an angular orientation of the steering wheel). As another example, an electronic switch 40 within an operator's station may be actuated by an operator to provide an output signal to VCU 32 to actuate an unloading auger defining an external load 26.

Similarly, transmission control unit (TCU) 34 electronically controls operation of IVT 14, and is coupled with a plurality of sensors associated with operation of IVT 14. ECU 30 and TCU 34 are coupled together via a bus structure providing two-way data flow, such as controller area network (CAN) bus 36.

Figure 2:
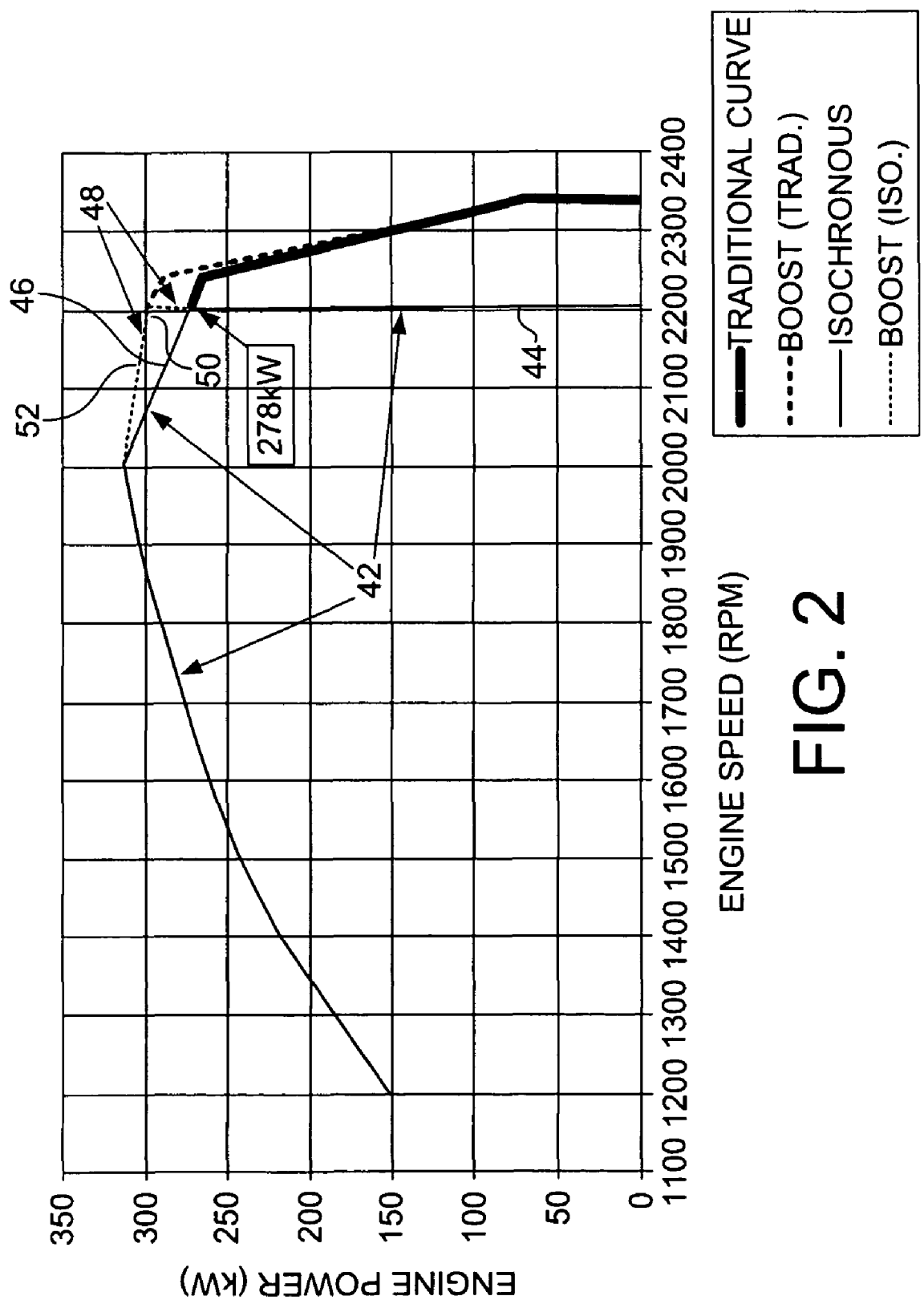
FIG. 2 is a graphical illustration of an embodiment of an isochronous torque curve with power bulge of the present invention.

Referring now to FIG. 2, there is shown a graphical illustration of an embodiment of an isochronous torque curve with power bulge of the present invention. Engine operating speed (in revolutions per minute (RPM)) is displayed on the ordinate (X) axis and engine power output (in kW) is displayed on the abscissa (Y) axis. The available torque from IC engine 12 is shown as base torque curve 42 wherein peak power output (or torque) occurs at intermediate RPM's significantly lower than the maximum rated engine rpm. In the illustrated embodiment, peak power output of approximately 317 kW occurs at approximately 2000 RPM, and the rated power output of approximately 278 kW occurs at the rated engine speed of approximately 2200 RPM. The isochronous portion 44 of base torque curve 42 is at the rated engine speed of IC engine 12, approximately 2200 RPM. When the IC engine is set at or close to the rated operating speed, base torque curve 42 is generally isochronous in that it has a very steep slope approaching a vertical slope. IC engine 12 is thus governed to provide an output power which ranges from zero to the rated output power at the rated operating speed.

At the top of the isochronous portion 44 of base torque curve 42, the rated output power coincides with the rated output power on a typical torque curve with linear droop between the rated output power and the peak output power at 2000 RPM. For operation in a normal mode, the torque curve then follows the typical torque curve with linear droop until the peak power output is reached. The power output then falls off as the engine speed decreases from the point of peak power output. This provides a linear droop 46 over and above the rated power output at the top of the isochronous portion 44 of base torque curve 42.

It will be appreciated that the linear droop 46 provides an increase in output torque as the engine speed falls from the rated speed of 2200 to 2000. However, under some operating conditions, linear droop 46 may not be sufficient to allow a crop slug or other transient load to be "powered through" without the feeling of losing power to the operator. In those instances, a boost torque curve 48 provides a power bulge with an extension of isochronous portion 44 to a higher, rated boost power output 50. From the rated boost power output 50, the boost torque curve 48 then has a linear droop 52 until the peak power output at 2000 RPM is reached. Linear droop 52 has a lesser slope than linear droop 46 so that the power output remains closer to the peak power output as the engine speed decreases from the rated engine speed.

To utilize the power bulge associated with boost torque curve 48, electrical processing circuit 28 can receive an input signal indicating the use of a high external load, such as an output signal from switch 40 indicating the use of an unloading auger. Electrical processing circuit 28 then assumes that the power boost in a boost mode will be desirable, and uses the power boost torque curve 48 to extend the isochronous portion of base torque curve 42.

As another option, it is also possible to sense the power output from IC engine 12. If the engine operating speed is still set at the rated operating speed, but the engine power output is moving toward or slightly above the rated power output, then this could infer that there is not enough power available at the rated engine speed. In that case, the power bulge can be implemented using the boost torque curve 48.

Figure 3:
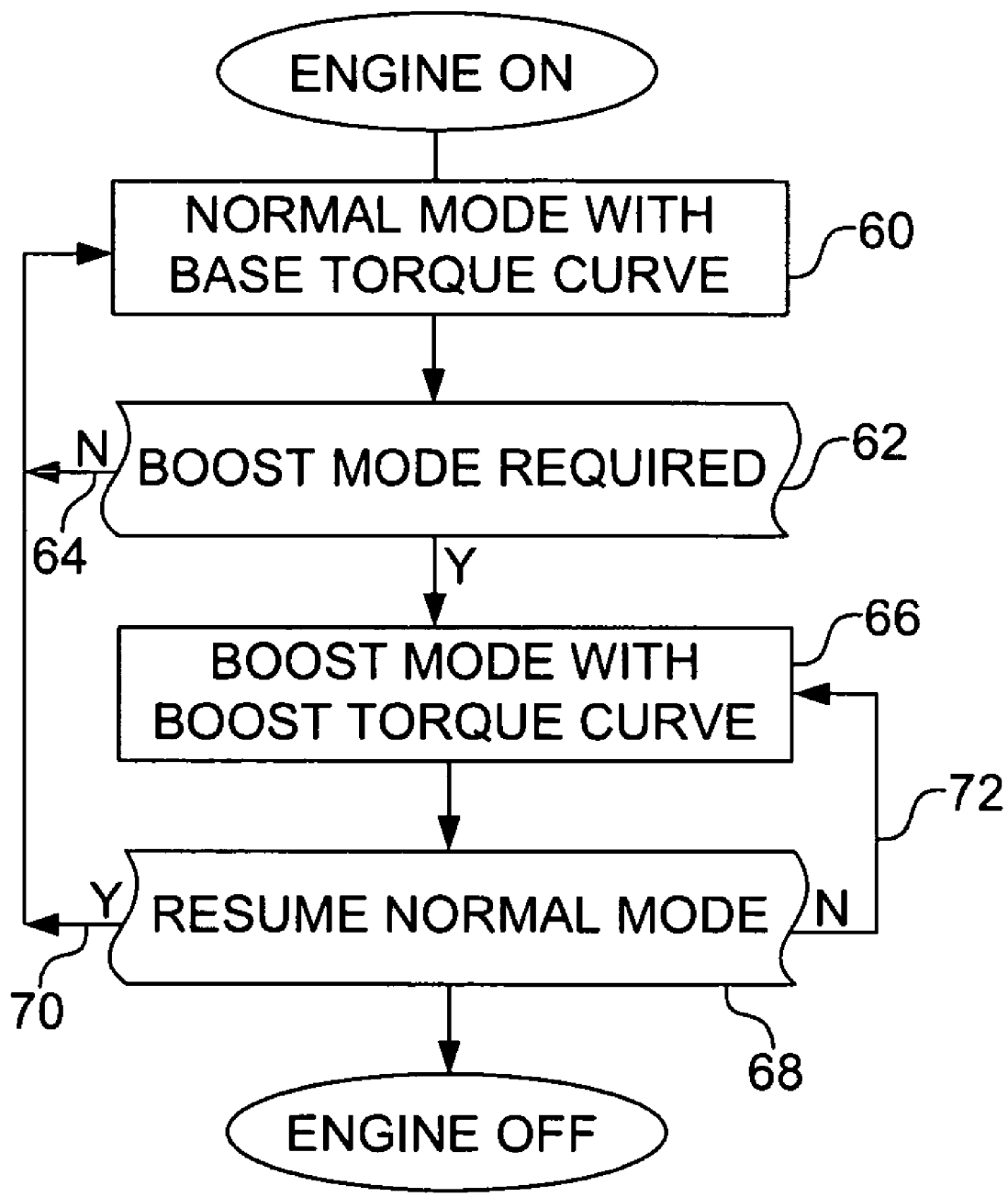
FIG. 3 illustrates a flowchart of an embodiment of the method of operation of an agricultural harvester of the present invention.

Referring now to FIG. 3, there is shown a flowchart of an embodiment of the method of operation of agricultural harvester 10. After harvester 10 is turned ON, the IC engine 12 is operated in a normal mode using the base torque curve 42 under most operating conditions (block 60). The control logic remains in a wait state (decision block 62, line 64) until an operator actuates a load such as an unloading auger which is a high load on IC engine 12. Electrical processing circuit 28 then operates IC engine 12 in a boost mode with boost torque curve 48 (block 66). This in essence extends the isochronous portion of the effective torque curve at the rated engine operating speed. Alternatively, electrical processing circuit 28 can switch to the boost mode by sensing the engine output power and set operating speed, as described above. If the operating conditions return to normal conditions not requiring extra boost (decision block 68, line 70), then the control logic returns to block 60 and IC engine 12 is again operated in a normal mode. On the other hand, if the high load conditions persist, then the control logic returns to block 66 and IC engine continues to operate in a boost mode.

From the foregoing, it is apparent that the present invention combines the advantages of a droop torque curve with the advantages of an isochronous torque curve. Agricultural harvester 10 uses the isochronous operation under most conditions at the rated operating speed which results in a consistent shoe speed and cleaning fan speed. The shoe speed may be fine tuned to an operating speed of 300 RPM at 2200 engine RPM without the fear of overspeed. Initial settings and adjustments of the combine in the field are consistent. Further, the present invention results in lower parasitic losses as a result of lower engine speed. The lower engine speed in turn improves the engine life.

Having described the preferred embodiment, it will become apparent that various modifications can be made without departing from the scope of the invention as defined in the accompanying claims.

The invention claimed is:

1. In an agricultural harvester, a method of operating an internal combustion (IC) engine, comprising the steps of:
    operating said IC engine in a normal mode with a base torque curve as a function of engine operating speed and engine power output, said base torque curve being generally isochronous at a rated operating speed over a power output range terminating at a rated power output; and
    operating said IC engine in a boost mode with a boost torque curve when a power boost is required above said rated power output, said boost torque curve having a power output which is above said base torque curve over a predefined range of said operating speed.

2. The method of claim 1, wherein said base torque curve has a peak power output at an engine operating speed lesser than said rated operating speed, and said base torque curve is generally linear between said rated power output at said rated operating speed and said peak power output at said lesser operating speed.

3. The method of claim 2, wherein when said IC engine is operating in said boost mode, said output power rises generally isochronously between said rated power output and said boost torque curve to a rated boost power output.

4. The method of claim 3, wherein said boost torque curve is generally linear between said rated boost power output at said rated operating speed and said peak power output at said lesser operating speed.

5. The method of claim 1, wherein said boost torque curve is used when an operator engages at least one electronic switch on the agricultural harvester.

6. The method of claim 5, wherein said at least one electronic switch corresponds to a user actuated external load.

7. The method of operating an IC engine of claim 1, wherein said rated operating speed is approximately 2200 revolutions per minute (RPM) and said lesser operating speed is approximately 2000 RPM.

8. The method of claim 1, wherein said base torque curve is generally isochronous at said rated operating speed between zero and said rated power output.

9. An agricultural harvester, comprising:
    an internal combustion (IC) engine including a fuel injection system;
    a detector providing an output signal representing a power output from said IC engine; and
    an electrical processing circuit coupled with said detector and receiving said output signal, said electrical processing circuit selectively operating said fuel injection system in one of a normal mode and a boost mode, wherein:
        said normal mode utilizes a base torque curve as a function of engine operating speed and engine power output, said base torque curve being generally isochronous at a rated operating speed over a power output range terminating at a rated power output; and
        said boost mode utilizes a boost torque curve when a power boost is required above said rated power output, said boost torque curve having a power output which is above said base torque curve over a predefined range of said operating speed.

10. The agricultural harvester of claim 9, wherein said output signal from said detector corresponds to one of said power output from said IC engine and a total load on said IC engine.

11. The agricultural harvester of claim 9, wherein said base torque curve has a peak power output at an engine operating speed lesser than said rated operating speed, and said base torque curve is generally linear between said rated power output at said rated operating speed and said peak power output at said lesser operating speed.

12. The agricultural harvester of claim 11, wherein when said IC engine is operating in said boost mode, said output power rises generally isochronously between said rated power output and said boost torque curve to a rated boost power output.

13. The agricultural harvester of claim 12, wherein said boost torque curve is generally linear between said rated boost power output at said rated operating speed and said peak power output at said lesser operating speed.

14. The agricultural harvester of claim 9, wherein said rated operating speed is approximately 2200 revolutions per minute (RPM) and said lesser operating speed is approximately 2000 RPM.

15. The agricultural harvester of claim 9, wherein said base torque curve is generally isochronous at said rated operating speed between zero and said rated power output.

* * * * *